3,386,102
INK SUPPLY SYSTEM FOR RECORDING
APPARATUS
Peter Scheuzger, Highland Park, and Marshall S. Joseph, Chicago, Ill., assignors to Victor Comptometer Corporation, Chicago, Ill., a corporation of Illinois
Filed Sept. 28, 1966, Ser. No. 582,729
10 Claims. (Cl. 346—140)

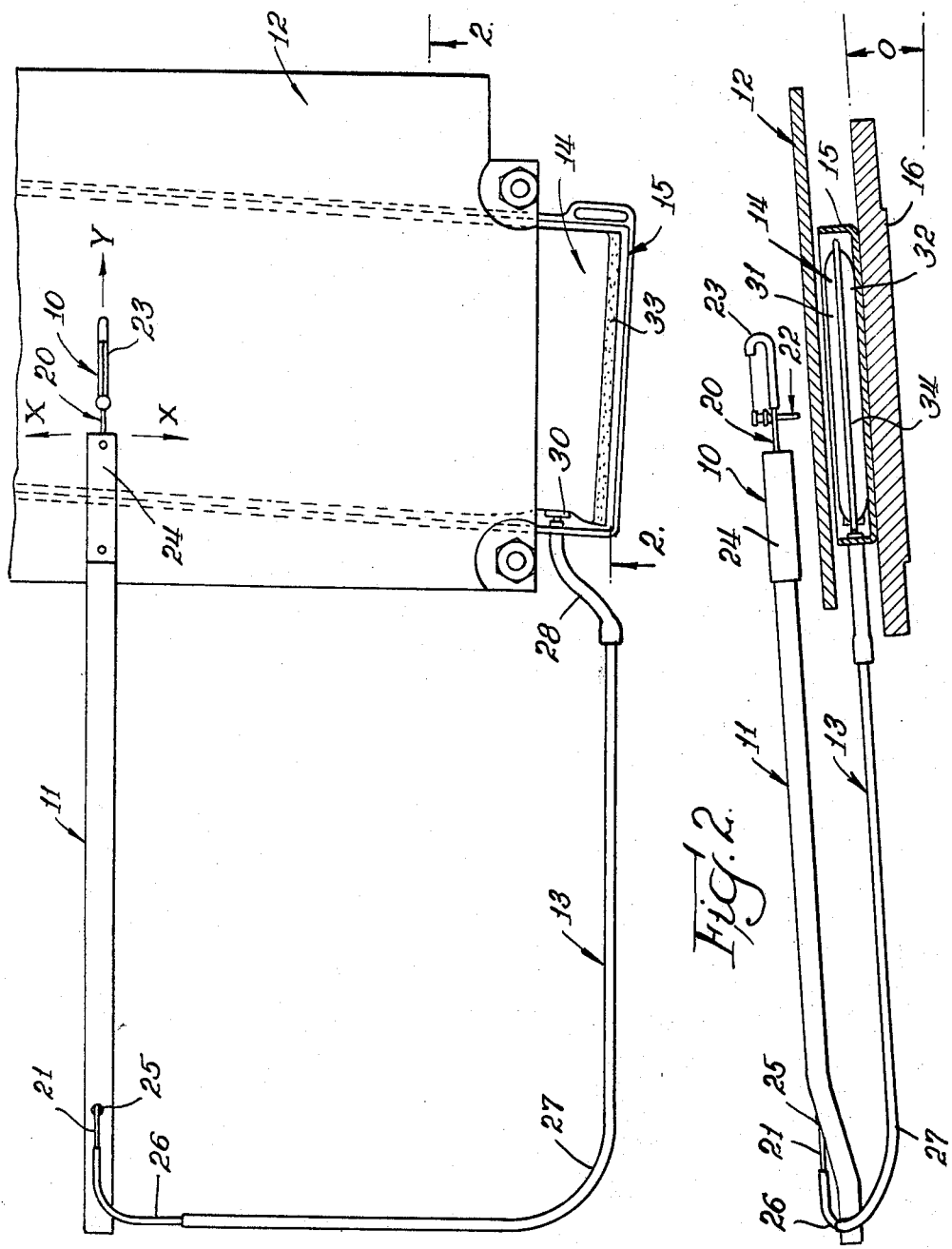

ABSTRACT OF THE DISCLOSURE

An ink supply system for graphic recorders utilizing high speed capillary recording pens wherein liquid ink is supplied to the pen from a remote sealed reservoir via a combined pressure-capillary conduit system which provides pressure actuated flow of ink from the reservoir to a remote location whereat ink is conducted to the recording pen by capillary flow.

---

This invention relates generally to recording means in graphic recording apparatus and more particularly to improved means for supplying ink to recording pen means used in graphic communications systems.

While the present invention has application to and utility in graphic recording apparatus in general, it is especially adapted to high speed graphic communication system recorders, wherein the recording pen moves omnidirectionally over a recording area supporting a recording medium, such as paper and is supplied with ink from a remote supply source. In such systems the pen means is required to maintain relatively high speed operation with rapid acceleration and deceleration and is periodically interrupted in its engagement with the recording medium. One such recording instrumentality of this general character is described in United States Letters Patent No. 2,583,535, issued Jan. 29, 1952.

According to present recognized practice of the art, ink supply systems for such graphic recorders have been generally limited to either so-called "capillary" systems or "pressure" systems. In a capillary system a remote ink reservoir, usually of an open gravity type, is connected to the recording pen nib via a capillary tube system. Ink is lifted from the stationary ink reservoir to the recording pen by capillary action only, but since this lift is definitely limited, such capillary systems generally have been restricted in use to recording instruments having so-called horizontal recording areas wherein the recording surface or medium is disposed in a plane having an angle to the horizontal of less than 30°.

In order to overcome the recognized height or lift limitations of capillary systems, positive pressure supply systems usually have been resorted to. Such pressure systems while overcoming the overall height limitations to which the ink may be raised by capillary action alone are subject to other drawbacks, such as the problem of maintaining uniform pressure on the ink supply without flooding the recording nib or pen and the requirement for very sophisticated pressure controls.

In such systems, one of the major problems affecting the operational capability and dependability of pen performance lies in the retention of uniform ink viscosity. The open gravity ink reservoirs, for example, are highly susceptible to the loss of liquid medium, such as water vapor from the ink, which resultantly causes change in ink viscosity and ultimate plugging of the recording pen, particularly if periods of idleness are experienced between recording demands. One manner of overcoming the change of viscosity in such ink systems, is to enclose the ink supply in a sealed reservoir or container and such a program has been resorted to with a fair degree of success, particularly in enclosed pressure supply systems. In still other instances, enclosed or hermetically sealed ink supply reservoirs have been used in conjunction with pure capillary ink supply systems. However, such previous efforts in the art, have as yet to prove completely satisfactory, particularly in high speed recorders.

In view of the above outlined factors, the present invention is directed to improvements in ink supply systems, particularly for graphic recorders as aforenoted, wherein the advantages of both pressure and capillary ink supply systems are combined while avoiding many of the difficulties and drawbacks of such systems as heretofore known. In brief, the present invention comprises a unique combination of elements in an ink supply system for graphic recorders whereby a remote ink reservoir maintains substantially uniform ink viscosity for extended periods and supplies a capillary inking pen in such a manner that the performance capability of the recording pen permits rapid acceleration and deceleration thereof at relatively high speed operation, as well as periodic interruption of ink flow without plugging or flooding the pen nib to afford a more dependable and operationally capable ink recording system than heretofore known. Among other features, the present invention embodies an enclosed ink supply reservoir comprising a low permeable flexible plastic bag which provides a sealed barrier to vapor transmission from the ink thereby to maintain uniform ink viscosity for extended periods. Such reservoir in turn is coupled to a remotely located capillary pen via a combined pressure-capillary tube system, pressure being applied to ink in the compressible reservoir chamber and tube system by the force of gravity. This arrangement permits advantageous uniformity of supply pressures characteristic of capillary ink supply systems while avoiding the necessity of locating the ink reservoir in a particular elevation position with respect to the capillary inking pen. Thus this invention gains many of the advantages of the remote positioning and location of "pressure" system ink reservoirs while utilizing the feed or supply regulation of a capillary system. In addition to the aforenoted features of a combination pressure-capillary supply system, the present invention also contemplates means for readily detaching a sealed reservoir from the ink supply conduit means and means for positively priming and depriming the system in a novel manner.

One important object of the present invention is to provide an improved ink supply system which maintains uniform performance capability of a capillary recording pen.

Another important object of the present invention is to provide an ink supply system having an enclosed ink reservoir and comprising a flexible vapor barrier whereby ink within the enclosed system is maintained at a relatively constant viscosity for extended periods.

Another object of this invention is to provide ink supply systems for graphic communication system recorders which embodies a combination of pressure and capillary supply conduits between a capillary recording pen and a remote ink supply reservoir.

Still another object of the present invention is to provide an improved ink supply system for graphic communication system recorders which is characterized by improved dependability of operation and performance capability of the recording pen.

Still another object of this invention is to provide an ink supply system and recording pen means wherein the latter is supplied with ink via a closed pressure-capillary system wherein pressurization of the system is effected by gravity.

The above and further objects, features and advantages of this invention will be recognized by those familiar with the art from the description of preferred and modified embodments illustrated in the accompanying drawings wherein:

FIGURE 1 is a partial top plan view of a graphic recorder ink supply system and pen means according to the present invention;

FIGURE 2 is a cross-sectional view of the assembly illustrated in FIGURE 1 taken substantially along vantage line 2—2 of FIGURE 1 and looking in the direction of the arrows thereon;

Figure 4:
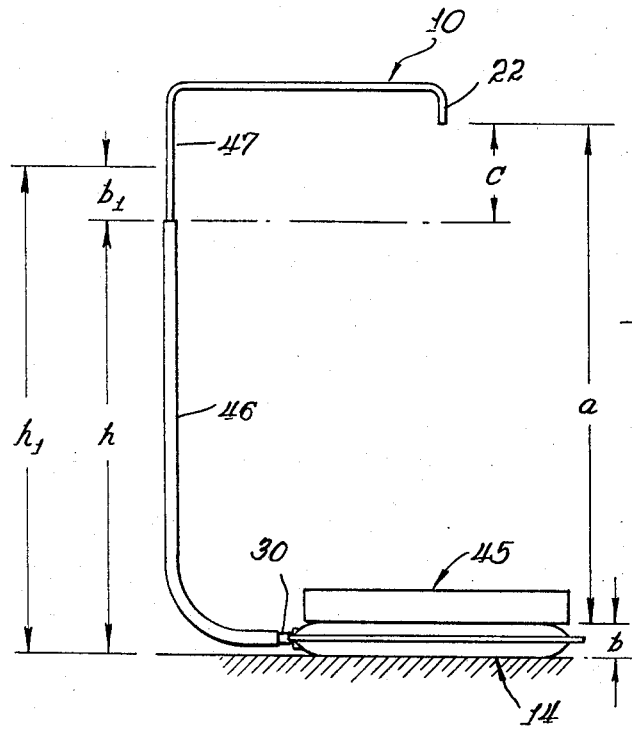
FIGURE 4 is a schematic view of a modified form of the supply system according to the present invention in which an auxiliary gravity weight is employed.

Having thus described our invention, the best mode presently contemplated for carrying out its concepts and features will now be described in conjunction with an illustrative embodiment and modifications shown in the accompanying drawings, so as to enable those skilled in the art to make and use the same.

As best shown in FIGS. 1 and 2, the recording means and inking system according to our invention is especially adapted for utilization in graphic recorders exemplified by the type described in detail in the aforenoted Patent 2,583,535 of which only portions are illustrated. In brief, the present invention comprises capillary pen means 10 supported on a rigid pen arm 11 which is adapted to be moved omnidirectionally along X and Y coordinates as indicated in FIG. 1 in response to the driving activity of suitable driven linkage means coupled to the pen arm in a known manner, as described in the above referred to Patent 2,583,535. The driving of the pen arm serves to move the pen means 10 over the planar surface of a suitable recording medium, such as a web of paper or the like, supported on the upper surface of a supporting platen or platform 12 associated with the recording apparatus and which, in the particular embodiment illustrated, is a planar member inclined to the horizontal (FIG. 2). The pen means 10 is supplied with a suitable recording liquid or ink by means of a hose assembly 13 coupled at one end to the pen means and having sealed communication with a suitable ink reservoir means 14 carried in tray means 15 carried beneath the platen member 12 and supported on an underlying structural member or plate 16 associated with the recorder equipment. Having thus enumerated the fundamental elements comprising the combination of the present invention, the detail aspects of each will now be set forth.

Turning to the features of the pen means 10 per se, such may constitute any of a number of known capillary recorder pens, however, a preferred type is set forth and described in United States Patent 3,096,742 issued July 9, 1963 to which reference may be had for detailed description of the structural concepts, features and operational advantages of the particular type of capillary pen means illustrated in FIGS. 1 and 2.

In brief, however, pen means 10, as illustrated, includes an elongated metal capillary supply tube 20 which is mounted in and supported by the pen arm 11 and has a supply end 21 to which the hose assembly 13 is attached. At the opposite or outer writing end of the supply tube 20, writing nib member 22 extends transversely of the longitudinal axis thereof and constitutes a capillary tube section having communication with the hollow interior of the supply tube 20; the lower end of the nib 22 being suitably formed to engage the paper or recording medium supported on the platen member 12. As illustrated, pen means 10 also includes a tubular portion 23 which projects axially of tube 20 beyond the writing nib 22 and which comprises a small auxiliary ink reservoir member, preferably formed as a flexible open ended tube connected to and mounted over the outer end of the supply tube 20 immediately past the latter's junction with the writing nib 22. Generally speaking in pen structures of this type the material of the reservoir member 23 is usually wettable by the ink or writing medium employed so that when the pen is placed in operation a small supply of ink is drawn by capillary action not only into the nib 22 of the pen, but also into the reservoir member 23. It is to be noted that the outer end of the reservoir member 23 is turned upwardly which assists materially in preventing the loss of liquids from the interior thereof particularly in the presence of rapid acceleration and deceleration forces during movement of the pen means. In essence, as described in the aforenoted Patent 3,096,742, the presence of the reservoir member 23 serves to maintain an inertia ink supply to the pen nib 22 so that upon rapid acceleration of the pen assembly away from the ink supply (in the Y direction indicated in FIG. 1) ink will be supplied to the pen nib from the auxiliary reservoir member 23. Conversely, upon movement of the pen means in a reverse direction, the reservoir member 23 receives ink to restore its supply. It thus will be readily recognized and appreciated by those familiar with the art that the pen means 10 as herein illustrated and described preferably comprises a capillary pen system wherein the writing nib 22 and the supply tube 20 therefor constitute capillary tubes for drawing ink or liquid therealong by capillary activity.

As above-mentioned, the pen arm 11 is adapted to support the pen means 10 and to this latter end the capillary supply tube 20 of the pen means is preassembled with a mounting block 24 adjacent the nib 22. The block 24 supports the tube 20 in cantilever fashion so that the nib 22 resiliently floats up and down during operation. The block 24 in assembly is pressed fitted into a suitable socket formed for that purpose in the outer end of pen arm 11 with tube 20 extending along the interior axis of arm 11 to a point adjacent the driven end thereof whereat it emerges via opening 25 for connection with the hose assembly. Because of the high acceleration and the rapidity of movements contemplated in a recorder apparatus of the type to which the invention has particular merit, the pen arm 11 is generally constructed of light weight metal or plastic and as mentioned is driven omnidirectionally by suitable initiating linkage means, for example as described in the above-noted Patent No. 2,583,535.

As previously mentioned, the supply end 21 of tube 20 is coupled to one end of the hose assembly 13 by which it is supplied with recording liquid or ink. It will be especially noted that the hose assembly 13 comprises, as illustrated, several sections or lengths of hose or tubing having distinctly different diameters. For example, in the particular embodiment illustrated in FIGS. 1 and 2, hose assembly 13 comprises three lengths of different diameter tubing indicated at 26, 27 and 28.

The section of tubing 26 is a capillary member having an internal diameter of substantially .022 inch and preferably constructed of 24 gauge flexible plastic tubing having a wall thickness of substantially .012 inch.

As shown one end of the capillary tube section 26 is coupled directly over the outer end of the supply end 21 of the capillary supply tube 20 associated with the pen means 10. The other end of tube 26 is coaxially received in an adjacent end of the pressure hose section 27 which bears an internal diameter of substantially .042 inch and a wall thickness of substantially .016 inch; again preferably made as a flexible plastic tubing of a nomnial 18 gauge designation. In practice with a hose section of substantially 2 inches for the capillary tube section 26, the pressure tube section 27 will have a relative length of approximately 9 inches, although these designations of lengths are by no means critical particularly as applied to the length of the pressure hose for reasons which will appear presently.

While the one end of the tubular section 27 is coaxially slipped over the capillary tube section 26, as above explained, the opposite end thereof is similarly fitted inside a short length of pressure tubing 28, as best illustrated in FIG. 1 of the drawings. In accordance with the above-disclosed examples of tubular dimensions, the internal diameter of tubular section 28 may be in the order of substantially .059 inch with wall thickness of approximately .016 inch; the same being designated 15 gauge plastic tubing and having a length substantially less than the pressure tube section 26. It is to be recognized that in function, both the tubular sections 27 and 28 are so-called "pressure" tubes having internal diameter preventing the conducting of liquids therealong by "capillary action" as is carried out in the capillary tube section 26 and the capillary supply tube 20 of the pen means.

In the particular embodiment of the invention illustrated in FIGS. 1 and 2, the provision of the two sections or lengths of pressure tubing 26 and 27 is for the purpose of permitting a convenient means and local for disconnecting the ink reservoir means 14 from the hose assembly 13 by disconnecting tube section 28 from the tube section 27, when removal of the reservoir means 14 is desired. While the one end of the shortened pressure tube section 28 is fitted over the adacent end of the longer pressure tube section 27 as above-described, the opposite end of the tube section 28 is fitted to a hose connector means 30 which is mounted with sealed connection to one margin of the plastic reservoir means 14.

With particular reference now to reservoir means 14, it will be recognized from FIGS. 1 and 2 that the same is formed as a generally rectangular envelope, preferably made of a pliable pastic material characterized by an ability to substantially prevent the passage of moisture vapor and other gases and liquids therethrough and having sufficient transparency to permit visual inspection of the contents of the envelope (in this case a supply of ink). The plastic material also preferably should have good tear strength, flexibility and dependability of service over a wide temperature range (approximately —320° F. to 390° F.) as well as the capability of being sealed under heat. Fluorohalocarbon plastic films have been found satisfactory for the purposes of the reservoir envelope.

In structure the envelope of the reservoir means 14 is formulated by upper and lower half shell portions or wall members comprising rectangular sections of pliable plastic material having the above-described properties and designated in FIG. 2 at 31 and 32, respectively. A sealed seam 33 interconnects the marginal edges of the two portions 31 and 32 to provide a sealed interconnection to enclose an ink containing chamber therebetween.

The hose connector means 30 is attached to one margin and adjacent one corner of the tubular envelope and effectively sealed thereto in a manner to prevent the leakage of fluid except through the outlet nozzle thereof which is connectable to the pressure tubing 28 as hereinabove described. In this manner, a substantially sealed, pliable and readily compressible reservoir chamber for containing a body of ink 34 is provided. In practice such an envelope is substantially filled with ink or recording liquid to be supplied to the pen means 10; the sealed construction of the envelope chamber and the properties of the selected plastic material as above-indicated, substantially preventing the loss of liquid and vapor from the ink so that the same maintains uniform viscosity for extended periods of time. This feature materially assists in the overall operational capabilities and effectiveness of the ink supply system and recording pen means.

It will be noted that in assembly with the recording device, the flexible bag or envelope of reservoir means 14, containing the supply of ink as above-described is housed and carried within an open top tray means 15 comprising a rectangular container of shallow dimension designed to accommodate the dimensions of the filled ink bag or envelope; such tray means 15 preferably being formed of a light weight material such as plastic or light metal, such as aluminum. The tray means performs the function of protecting the ink containing bag or envelope from rupture and as a safety device against possible ink leakage to the recorder in the event of accidental rupture of the envelope in its stored position within the tray means. The tray means also acts as a shipping container for the bagged ink or envelope so that a recorder equipped with the inking system according to this invention may be trans-shipped with the ink supply sealed within the envelope reservoir 14.

In its mounted position the tray means is slidingly fitted and held in the space between the platen member 12 and the underlying plate like support member 16 of the recording apparatus as best illustrated in FIG. 2 of the drawings. It is to be noted in this respect that in the particular illustrated example the recorder is a so-called "horizontal" type and that the tray means is inclined to the horizontal at an angle O (see FIG. 2) which may be in the order of 5°. Therefore, the nib of the pen means 10 operates at a varying height with respect to the level of the ink supply in the remote reservoir means 14 which varies as the ink consumption progresses. It further will be noted that because of the inclination of the tray means 15 to the horizontal and the biased alignment thereof (see FIG. 1), the ink gravitationally flows toward the lower margin and one corner of the tray and envelope at which the hose connector means 30 is located. Thus ink flow from the reservoir means is accomplished by gravity pressure and not by capillary action. While at initial installation the reservoir means 14 is normally completely filled with ink and all air excluded, it is possible that a small air bubble may remain in the envelope at initial filling. The slight inclination at which the ink reservoir is positioned however allows any air bubble, if present, to move to the diagonally opposite marginal edge and corner of the reservoir, away from the discharge nozzle of the hose connector, thus avoiding any interference of the air with the free flow of ink into and along the hose assembly. This feature is particularly important to the successful and dependable operation of the capillary system which occurs in tube section 26 and supply tube 20 of the pen means.

Due to the fact that the flow of ink from the reservoir means 14 is by gravity pressure, the hose sections 27 and 28, as previously indicated, are purposely selected to have internal diameters which avoid capillary flow therein. As a consequence, the flow of ink from the reservoir means 14 progresses by pressure to the point where capillary flow to the pen commences, i.e. herein shown as the junction between tube section 27 and the capillary tube 26, which is removed from the ink in reservoir means 14. Because of the combined pressure-capillary flow features characterizing the supply system according to this invention, the ink reservoir means 14 therefore need not be in close proximity to the pen nib since the restriction of capillary rise alone has been eliminated between the reservoir location and writing nib of the pen. This permits greater flexibility of location and mounting of the ink supply in graphic communication apparatus of the character described. Additionally, because capillary flow rate is generally inversely proportional to the square of the length of the capillary hose or supply conduit, faster writing of the pen means is gained by means of the present invention wherein the point of capillary flow initiation is remote of the ink supply reservoir and closer to the pen means as described.

With particular comment on the features of the flexible ink reservoir means, it is to be noted that according to the illustration of FIG. 2 the reservoir means is located at a level which is lower than the pen nib 22. Although it is theoretically acceptable for the reservoir means to be located at or slightly above the pen means 22 so that the total hydrostatic head of the reservoir and hose supply system is approximately equal to the surface tension restriction of the capillary tubing and opening of the pen nib, due to rapid movements of the described pen, hose and the small auxiliary reservoir structure beyond the nib of the pen, certain pumping action may occur which could cause flooding of the pen nib. For that reason it is preferable that the level of the ink in the reservoir means be located below the pen nib, in installations as illustrated in FIG. 2.

Turning now to the features of the modified structure illustrated in FIG. 3 of the drawings, an alternative connection of the hose assembly with the reservoir envelope 14 will now be described. It will be recognized that the pressure hose section 28 of FIGS. 1 and 2 is replaced in this modified structure by a combination pressure hose and priming bulb member 35; the priming bulb portion 36 thereof constituting an enlarged generally spherical section of the tubular member 35 located intermediate the ends thereof. As with the pressure hose 28 previously described, one end of the modified pressure hose member 35 is coupled directly to the discharge hose connector means 30 associated with the flexible ink reservoir means 14. The opposite end thereof is however frictionally pressed over the outside of a reducing needle means 37 comprising a short length of metal tubing having an internal diameter slightly smaller than the internal diameter of the pressure hose 35.

As shown the reducer needle means 37 is mounted on an outstanding ear portion 38 provided adjacent the upper end of a sliding metal bracket member 39 having a planar main body portion 40 formed with an elongated slot 41 therein. Mounting rivets or studs 42—42 slidably support the bracket member on the structural frame of the recording apparatus, indicated in phantom lines and designated 43 in FIG. 3. In this manner, the bracket means 39 is free to slide up and down between limits carrying therewith the reducer needle means 37. When replacing the reservoir envelope 14, the bracket and needle assembly is lifted upwardly to its dotted line position as shown in FIG. 3, thereby elevating the level of the hose member 35 at the reducer needle higher than the maximum level of the ink in the reservoir envelope 14. The hose 35 may then be readily disconnected from the reducing needle without risking spillage of ink remaining in the tubular hose member 35. By the same token a replacement of the reservoir bag having a priming bulb and hose member 35 attached thereto, may be readily accomplished without fear of spilling ink therefrom by reversing the above outlined procedure. After replacing an empty reservoir with a filled reservoir, the bracket means 39 is lowered to its full line operating position as illustrated in FIG. 3. Ink will thereafter flow by gravity through the pressure passageway means of the hose assembly as previously described.

The priming bulb portion 36 of the member 35, is provided as a convenient means for positively commencing capillary flow which takes place in the tubular hose sections 26 and the pen supply tube 20. In order to initiate such capillary flow, the priming bulb is merely compressed by hand and to positively force ink into the capillary tubing section 26 and pen means. Conversely, the bulb portion 36 may also be used for depriming the ink from the capillary pen means and hose sections past the needle means 37. This function is carried out by compressing the bulb means 36 slowly accompanied by pinching off the tube member 35 between the bulb portion 36 and the reservoir bag 14. Upon releasing of the compressed bulb section 36 the ink in the hose sections as well as in the pen means 10 will be drawn into the bulb in order to satisfy the partial vacuum effected by expanding the bulb portion 36.

Figure 3:
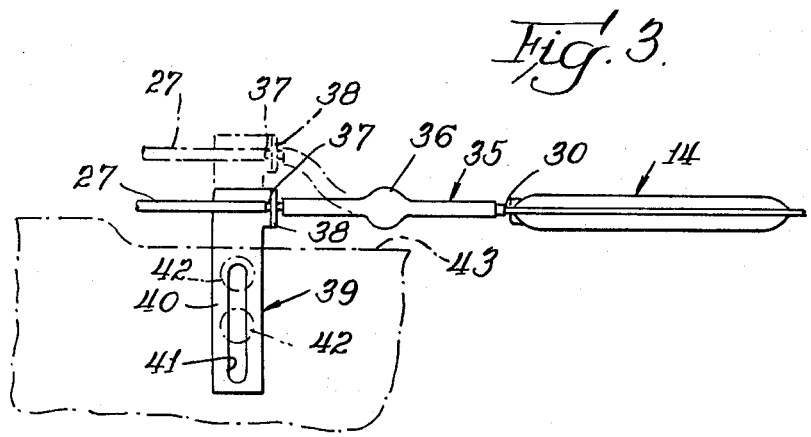
FIGURE 3 is a view in side elevation illustrating a priming means for modifying the system illustrated in FIGURES 1 and 2.

It is to be noted with respect to the modified structure illustrated in FIG. 3, that whereas the interior diameter of the reducing needle 37 is smaller than the internal diameters of the pressure hose member 35 and 27 which it interconnects as shown in FIG. 3, nevertheless the same has a non-capillary internal diameter in order to maintain pressure supply to the point of initiating capillary action occurring in the capillary tubing 26. It is fully contemplated as well that in certain installations it may be desirable to locate the reducing needle 37 at a position more adjacent the pen assembly 10 than the reservoir means 14. In that event the reducing needle 37 may interconnect the pressure supply tubing 35 directly to the capillary tubing 26 and therefor act as the connecting link between the non-capillary tubing of the hose assembly and the capillary tubing thereof.

Referring now to FIG. 4 of the drawings, the basic operating principles and features of our aforedescribed combined pressure-capillary inking system are schematically represented therein, in conjunction with a modification of the basic system illustrated in FIGS. 1 and 2. In particular an auxiliary gravity weight plate means 45 is shown in FIG. 4 for the purpose of positively pressurizing the flexible reservoir means 14. This modified form of the present invention is particularly adaptable for installations wherein remote positioning of the reservoir means at relatively great distances or levels beneath the capillary pen nib is desirable. It is to be understood however, that while the positive weight plate means 45 is involved in the modified form shown in FIG. 4 of the drawings, nevertheless the principles and concepts therein illustrated apply with equal facility to the previously described embodiment illustrated in FIGS. 1 and 2. In schematic illustration of FIG. 4, the plastic envelope ink reservoir means 14 is superimposed by the auxiliary gravity weight plate member 45 and coupled via the hose connector means 30 to a pressure hose 46 leading to a capillary tubing 47 communicating with the writing pen nib 22.

The maximum ink rise (see FIG. 4) produced by capillary action alone is indicated by dimension ($c$) and mathematically defined by the equation:

$$c = \frac{2T \cos \theta}{rdg}$$

where $T$ = Surface tension of liquid (dynes/cm.)
$\theta$ = Angle of contact at edge of liquid surface and wall of tube (degrees)
$r$ = Radius of tube (cm.)
$d$ = Density of fluid (grams/cm.$^3$)
$g$ = Gravity (cm./sec.$^2$)

By confining the ink in a compressible bag or reservoir means 14 as illustrated, it becomes a relatively simple matter to pressurize the ink by use of a simple gravity weight or plate placed on top of the bag as indicated at 45 in FIG. 4. Ink will now be forced from the reservoir means 14 by pressure alone due to the weight plate 45 to a height ($h$) as indicated in FIG. 4 which is mathematically represented by the following formula.

$$h = \frac{p}{d}$$

where $p$ = Unit pressure
$h$ = Height to which the liquid will rise
$d$ = Density of liquid The total theoretical height ($a$) to which the combined pressure-capillary system according to this invention will function is therefore the theoretical combination of heights ($c$)+($h$). The height ($h$) will decrease by the distance ($b$) (the filled thickness of the reservoir means 14) which is the difference between a reservoir full of ink and one empty. Therefore, it is generally necessary to have the pressure distance extend to height ($h_1$) which is the combination of the distance $(h)$+distance $(b_1)$ as indicated; distance $(b_1)$ being equal to or greater than the distance $(b)$ indicated in FIG. 4.

Even though a heavy metal plate is placed on the top of the plastic reservoir bag, the flexibility and reaction thereof to barometric pressure and temperature change will remain in effect because of the equilibrium conditions which obtained between the pressure due to the weight 45 and the column height of the ink in the hose 46. Therefore it is possible to use a non-capillary tube for hose 46 for the pressure distance of the system according to the concepts of this invention.

From the foregoing it will be readily appreciated that in circumstances where it is desirable, for example, to place the reservoir means 14 at a considerable distance beneath the recording pen means 10 of FIGS. 1 and 2 as opposed to the adjacent location thereof illustrated, resort to an auxiliary gravity weight or plate means 45 as represented in FIG. 4 is readily available without departing from the operating advantages obtainable with the basic structure of this invention as above described. Thus the reservoir means need not be in close proximity to the pen nib 22 as restriction on ink lift by capillary rise alone is eliminated by the present invention.

From the foregoing description it is believed that those familiar with the art will readily recognize and appreciate the novel advancement and merits of the present inventive combination over previously known ink means and systems in this art. Further while this invention has been described in relation to a particular illustrated embodiment thereof, shown in the accompanying drawings, nevertheless the same is susceptible to various modifications, changes and substitutions of equivalents without departing from the spirit and scope of the present invention. Therefore, it is intended that our invention be unlimited by the foregoing description except as may appear in the following appended claims.

We claim:

1. In a graphic communication recorder of the type having a capillary recording pen means movable omnidirectionally over a recording surface, an ink supply system comprising: enclosed ink reservoir means for storing a supply of ink under substantially uniform pressure imposed by atmosphere and gravity and at an elevation below the pen means, said reservoir means comprising a closed envelope formed with resiliently pliable walls of plastic material which substantially prevents the transmission of moisture therethrough and which walls are sealed along their margins to form therebetween a readily compressible sealed chamber for the storage of ink; and a flexible hose assembly communicating between said chamber and said pen means comprising, a non-capillary passageway means communicating at one end with said chamber and at the opposite end thereof with a capillary passageway means communicating directly with said pen means whereby ink is conducted from said reservoir means along said non-capillary passageway means by pressure flow to one end of said capillary passage means and thence along said capillary passageway means to said pen means by capillary action.

2. The combination of claim 1 wherein said hose assembly comprises a flexible pressure hose section and a flexible capillary hose section coaxially interconnected to communicably interjoin said passageway means.

3. The combination of claim 1 including hose connector means mounted with sealed connection in one margin of said envelope for detachably for connecting said hose assembly thereto.

4. The combination of claim 1 wherein said non-capillary passageway means comprises a pair of hose sections each having a non-capillary internal passageway for the pressure flow of ink therethrough, and means detachably interconnecting the said sections whereby said reservoir means may be disconnected from said system simultaneously with one of said sections.

5. The combination of claim 1 wherein said reservoir means is removably mounted in an open-top tray means detachably supported on the framework of the recorder at an elevation lower than the recording pen means.

6. The combination of claim 1 and auxiliary static weight plate means superposed on said envelope to selectively increase the pressure of ink stored in said chamber.

7. The combination of claim 1 wherein said reservoir means is quadrangular in shape and is mounted in a position inclined to the horizontal with one corner thereof lowermost, said hose assembly being connected thereto adjacent said lowermost corner whereby any air in said envelope is trapped at an uppermost corner of said chamber diagonally opposite its connection with said hose assembly.

8. The combination of claim 1 including manually operable resilient bulb means disposed along the length of and in communication with said non-capillary passageway means for selectively manually priming and depriming said capillary passageway means.

9. The combination of claim 1 including vertically shiftable bracket means mounted on the frame of the recorder, tubular reducer needle means having a non-capillary internal passageway supported on said bracket means, and means movable therewith for communicably interconnecting the passageway of said needle means and the passageway means of said hose assembly.

10. The combination of claim 1 wherein said capillary passageway means is disposed remotely of said reservoir means and adjacent said pen means.

References Cited

UNITED STATES PATENTS

| | | | |
|---|---|---|---|
| 2,752,220 | 6/1956 | Squier | 346—140 |
| 2,820,689 | 1/1958 | Holloway | 346—140 |
| 2,977,180 | 3/1961 | Lenner | 346—140 |
| 3,026,165 | 3/1962 | Roerty | 346—140 |
| 3,054,109 | 9/1962 | Brown | 346—140 |
| 3,185,991 | 5/1965 | Gill et al. | 346—140 |

FOREIGN PATENTS 919,484  2/1963  Great Britain.

RICHARD B. WILKINSON, *Primary Examiner.*

JOSEPH W. HARTARY, *Assistant Examiner.*

UNITED STATES PATENT OFFICE
CERTIFICATE OF CORRECTION

Patent No. 3,386,102                                              May 28, 1968

Peter Scheuzger et al.

It is certified that error appears in the above identified patent and that said Letters Patent are hereby corrected as shown below:

Column 5, line 26, "adacent" should read -- adjacent --. Column 10, line 6, after "detachably" cancel "for"; lines 38 to 41, cancel "means, and means movable therewith for communicably interconnecting the passageway of said needle means and the passageway means of said hose assembly" and insert instead -- and movable therewith and means for communicably interconnecting the passageway of said needle means and the passageway means of said hose assembly --; line 51, "Lenner" should read -- Zenner --.

Signed and sealed this 25th day of November 1969.

(SEAL)
Attest:

EDWARD M. FLETCHER, JR.                         WILLIAM E. SCHUYLER, JR.
Attesting Officer                                    Commissioner of Patents